United States Patent [19]

Mass

[11] Patent Number: 5,544,448
[45] Date of Patent: Aug. 13, 1996

[54] STRUCTURAL DOOR BELT SEAL

[75] Inventor: Noah B. Mass, Ann Arbor, Mich.

[73] Assignee: Ford Motor Company, Dearborn, Mich.

[21] Appl. No.: 363,792

[22] Filed: Dec. 27, 1994

[51] Int. Cl.⁶ ........................................................ B60J 1/16
[52] U.S. Cl. ............................................ 49/377; 49/490.1
[58] Field of Search .......................... 49/377, 374, 475.1, 49/490.1, 502

[56]  References Cited

U.S. PATENT DOCUMENTS

| | | |
|---|---|---|
| 4,696,128 | 9/1987 | Fukuhara . |
| 4,949,507 | 8/1990 | Vaughan . |
| 4,976,067 | 12/1990 | Maass . |
| 5,018,308 | 5/1991 | Vaughan .............................. 49/374 X |
| 5,067,281 | 11/1991 | Dupay .................................. 49/377 X |
| 5,174,066 | 12/1992 | Dupuy ................................. 49/377 X |
| 5,207,027 | 5/1993 | Larsen ................................. 49/377 X |
| 5,261,188 | 11/1993 | Vaughan . |
| 5,363,537 | 11/1994 | Schneider et al. ................... 49/377 X |

FOREIGN PATENT DOCUMENTS

| | | |
|---|---|---|
| 0416899A1 | 5/1990 | European Pat. Off. . |
| 437974 | 7/1991 | European Pat. Off. ................. 49/377 |
| 3-65432 | 3/1991 | Japan . |

OTHER PUBLICATIONS

U.S. Ser. No. 08/103,373, filed Aug. 9, 1993, "Multiple Speed Automatic Transmission for Automotive Vehicles", to Pierce.

*Primary Examiner*—Jerry Redman
*Attorney, Agent, or Firm*—Daniel M. Stock

[57] ABSTRACT

A structural door belt seal (56) for an automotive vehicle is provided which includes an elastomeric seal member (60) mounted on a belt edge portion (51) of the door (50) and a stiffening member (70) carried within the elastomeric seal member (56), and further including a reinforcing member (72) extending outwardly from the elastomeric seal member (56) with the stiffening member (70).

12 Claims, 1 Drawing Sheet

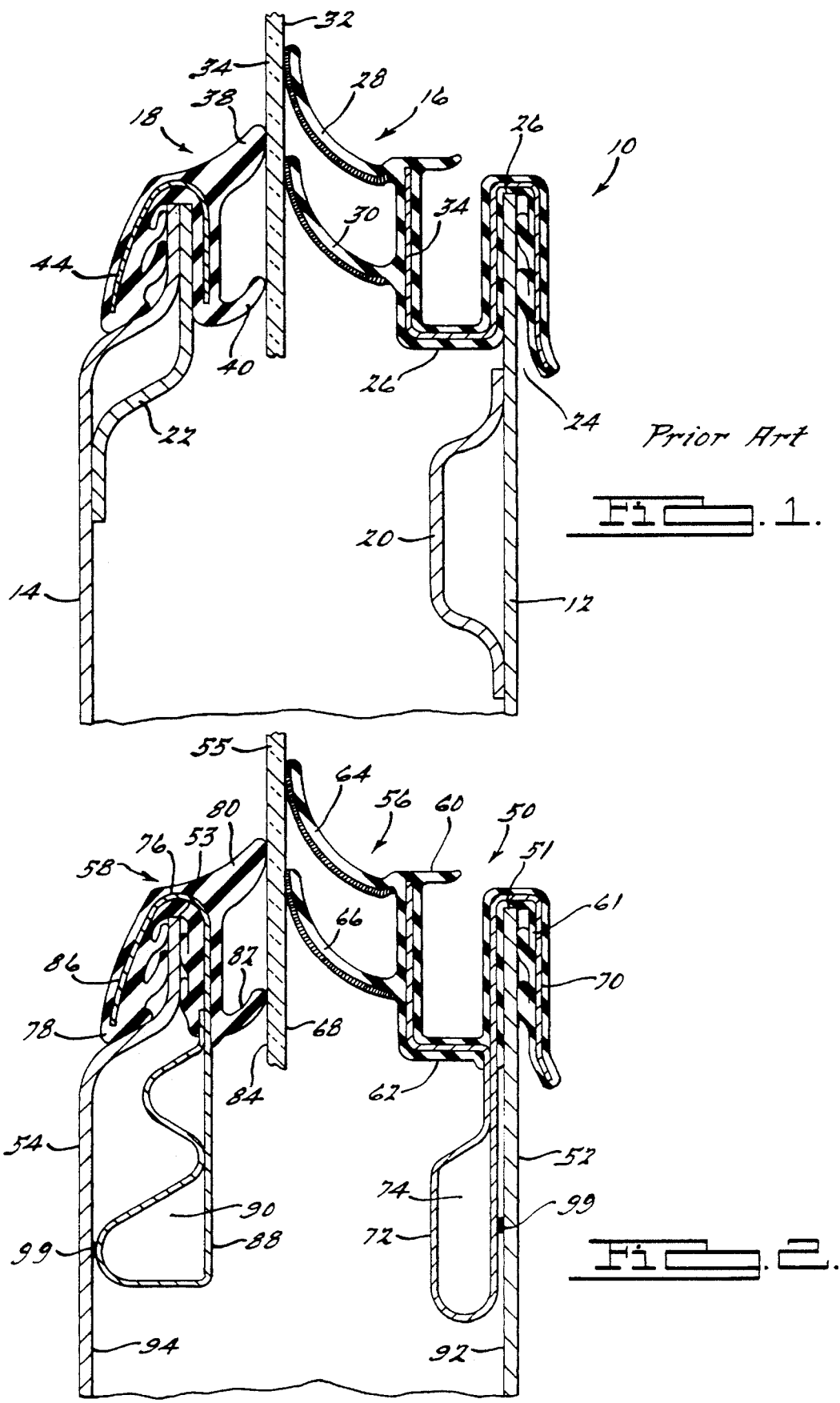

STRUCTURAL DOOR BELT SEAL

BACKGROUND OF THE INVENTION

1. Field of the Invention

The present invention relates generally to the construction of automotive vehicles doors, and more specifically to structure for reinforcing and sealing the belt edge of the door adjacent a window pane carried with the door.

2. Description Of the Related Art

In the design of automotive vehicle door assemblies, particularly those of the type in which vertically movable glass is installed, it is well known to provide a belt line seal mechanism which sealingly engages the window when it is attached to panels of the vehicle door. It is also known to provide reinforcing structure running substantially parallel with the belt seal for reinforcing the edge of the vehicle door in the region of the belt seal. The belt seal is utilized to prevent water from entering the vehicle, particularly as the glass moves between raised and lowered positions.

It is also known to provide stiffening members to reinforce the seal in its glass sealing and wiping environment. U.S. Pat. No. 4,949,507 to Vaughan is exemplary of such stiffened seals.

In many automotive door applications, the sealing and reinforcement functions between the panels of the door and the window pane are effected through two seal members and two reinforcing members carried much in the form shown in the exemplary prior art embodiment of FIG. 1 to be later described.

The prior art devices have been found to be functionally acceptable, but present certain disadvantages in the efficient fabrication of modern automotive vehicles.

They tend to exhibit higher weight and cost than is desired, and by requiring a multiplicity of parts, require increased assembly time and higher than desirable attendant cost. In addition, tooling for at least four separate parts used in such designs in the high volumes experienced in automotive production tends to be expensive and time consuming, and the mere existence of the four parts in the vehicle build inventory brings increases assembly for the manufacturer.

SUMMARY OF THE INVENTION

Responsive to the disadvantages of the prior art, the present invention provides a new structural door belt seal which includes an elastomeric sealing member having a stiffening member carried within it and a reinforcement member extending directly from the stiffening member and being arranged to be engageable with an adjacent door panel for reinforcing purposes.

According to one feature of the present invention the reinforcement member defines a closed box section below the sealing member and is integrally formed with the stiffening member.

BRIEF DESCRIPTION OF THE DRAWINGS

Other objects, features, and advantages of the present invention will be apparent to those skilled in the automotive body arts upon reading the following description with reference to the accompanying drawings, in which:

FIG. 1 is a depiction of the prior art door assembly; and

FIG. 2 is a cross sectional view similar to FIG. 1 showing an improved automotive door assembly employing a structural door belt seal according to the present invention.

DESCRIPTION OF THE PREFERRED EMBODIMENT(S)

Turning now to FIG. 1, an automotive door assembly 10 constructed according to the teaching of the prior art is illustrated. It includes generally an inner panel 12, an outer panel 14, an inner seal assembly 16, an outer seal assembly 18, an inner reinforcement 20, and an outer reinforcement 22.

The inner seal assembly 16 includes a generally U-shaped ribbed mounting pocket 24 that is engaged over a belt edge 26 of the inner panel 12. The seal assembly 16 is illustrated as an elastomeric sealing member and further includes a generally U-shaped extension portion 26 projecting laterally toward the door panel 14. Projecting laterally in cantilever fashion from the U-shaped extension portion 26 are a pair of flocked lip seal portions 28, 30 which engage an inner face 32 of a window pane 34 that is mounted in known fashion for vertical movement between the door panels 12, 14.

Additionally, a metallic stiffening member 34 is carried within the seal member 16 and may be coextruded with the elastomeric portions of the seal.

Similarly, the outer seal assembly 18 includes a U-shaped ridge mounting portion or pocket 36 and a pair of lip seals 38, 40 engaging an outer face 42 of the window panel 32. A stiffening member 44 is illustrated as being carried within the seal assembly 18 which is formed primarily as an elastomeric member.

The reinforcement 20 is illustrated as comprising a hat-shaped metallic beam secured to the inner panel 12 as by weldments (not shown). The reinforcement member 22 is illustrated as a profiled beam member, likewise secured to the outer panel 14 as by weldments (not shown).

Turning now to FIG. 2, an improvement to the door assembly 10 of FIG. 1 is illustrated as a door assembly 50. The door assembly 50 includes generally an inner door panel 52 and outer door panel 54, a window pane 55, an inner structural door belt seal assembly 56, and an outer structural door belt seal assembly 58. It is to be understood that the structural door belt seal assemblies are arranged to extend longitudinally substantially across the length of the vehicle door.

The inner and outer door panels 52, 54, respectively, are laterally spaced to receive the window pane 55 which is carried for vertical movement in a known fashion. The inner door panel terminates in an upper belt edge 51 and the outer door panel terminates in an upper belt edge 53. The inner structural door seal assembly 56 and the outer structural door seal assembly 58 are mounted on the belt edges 51, 53, respectively.

The inner structural door belt seal assembly 56 includes an elastomeric seal member, indicated generally at 60, which is formed to include a generally U-shaped ribbed mounting portion 61 received over the door belt edge 51. It also includes a generally U-shaped extension section 62 projecting laterally towards the window pane 55 and a pair of flocked lip seals 64, 66 projecting from the extension portion 62 in cantilever fashion towards the inner face 68 of the window pane 55 for sealing and wiping engagement therewith. A metallic stiffening member 70 is carried within the elastomeric seal member 60 and may be coextruded therewith in fabrication. The stiffening member 70 is carried fully within the seal member 60 and extends substantially coextensive with the U-shaped mounting portion 61 and with the extension portion 62. Extending downwardly from the stiffening member 70, and preferably formed integrally with it, is a reinforcement member 72 defining a closed box cross section indicated at 74. In the configuration shown in FIG. 2, it is illustrated that the stiffening member 70 may be fabricated with the reinforcing member as a single bent strip.

Similarly, the outer structural door belt seal assembly 58 is illustrated as including an elastomeric seal member 76 which has a generally U-shaped ribbed mounting portion 78 received over the door belt edge 53 of the outer panel 54. The seal member 76 also includes a pair of lip seal portions 80, 82 projecting perpendicularly inwardly and in cantilever fashion toward the outer face 84 of the window pane 55.

A stiffening member 86 is carried fully within the elastomeric seal member 76 and extends substantially throughout the mounting portion 78. Projecting downwardly from the stiffening member 76 is an outer reinforcing member 88 which defines a closed multiple cell box section 90.

It is to be understood that the reinforcing members 72, 88 may be secured in any suitable fashion, such as through clips or by welding as indicated at 99 to inner surfaces 92, 94 of inner and outer door panels 52, 54, respectively. Accordingly, inner and outer structural door seal assemblies 56, 58 present both a stiffened attaching and sealing function between the inner and outer door panels 52, 54 and the window pane 55 while providing structural reinforcement with respect to the inner and outer door panels 52, 54 by forming a beam, it being understood, of course, that the cross sections described in the preferred embodiment of 52 extend longitudinally of the vehicle along substantially the full extent of the vehicle door.

While only one embodiment of the structural door belt seal of the present invention has been described, others may be possible without departing from the scope of the following claims.

What is claimed is:

1. A structural door belt seal for operative engagement between an upper belt edge portion of an automotive vehicle door panel and a window pane carried adjacent the edge portion, the structural door belt seal comprising:

an elastomeric seal member having a mounting portion adapted to be received in mounting relationship on the edge portion and a lip seal portion adapted to be sealingly engaged against the window pane;

a metallic stiffening member having a first portion mounted within said elastomeric seal member; and a second portion forming a door reinforcement member carried and extending outwardly from the elastomeric seal member and fixedly secured to the door panel at a point below the elastomeric seal member.

2. A structural door belt seal as defined in claim 1, wherein said reinforcement member is integrally formed with said stiffening member.

3. A structural door belt seal as defined in claim 1, wherein said reinforcement member includes means defining a box section adjacent said seal member and interposed between the window pane and the door panel.

4. A structural door belt seal as defined in claim 1, wherein said reinforcement member extends outwardly from said elastomeric seal member away from the edge portion.

5. A structural door belt seal as defined in claim 4, wherein said reinforcement member includes means defining a box section adjacent said seal member and interposed between the window pane and the door panel.

6. A structural door belt seal as defined in claim 5, wherein said reinforcement member is integrally formed with said stiffening member.

7. A door assembly for an automotive vehicle, comprising:

an outer panel having an upper belt edge;

an inner panel laterally spaced from said outer panel and having an upper belt edge;

a window pane movable in vertical directions in a plane defined between said inner and outer panels; and a pair of structural belt seals operatively carried between the upper belt edges of the inner and outer panels, each structural belt seal comprising an elastomeric seal member having a mounting portion adapted to be received in mounting relationship on the respective door belt edge and a lip seal portion adapted to be sealingly engaged against the window pane, a metallic stiffening member having a first portion mounted within said elastomeric seal member, and a second portion forming a door reinforcement member and extending outwardly from the elastomeric seal member and fixedly secured to the respective door panel at a point below the elastomeric seal member.

8. A structural door belt seal as defined in claim 7, wherein said reinforcement member is integrally formed with said stiffening member.

9. A structural door belt seal as defined in claim 7, wherein said reinforcement member includes means defining a box section adjacent said seal member and interposed between the window pane and at least one of the outer and inner panel.

10. A structural door belt seal as defined in claim 7, wherein said reinforcement member extends outwardly from said elastomeric seal member away from the upper belt edge.

11. A structural door belt seal as defined in claim 10, wherein said reinforcement member includes means defining a box section adjacent said seal member and interposed between the window pane and at least one of the outer and inner panel.

12. A structural door belt seal as defined in claim 11, wherein said reinforcement member is integrally formed with said stiffening member.

* * * * *